United States Patent [19]

Van Amesfoort

[11] Patent Number: 5,410,223
[45] Date of Patent: Apr. 25, 1995

[54] DISPLAY DEVICE INCLUDING A BLACK LEVEL SETTING CIRCUIT

[75] Inventor: Alfonsus M. Van Amesfoort, Eindhoven, Netherlands

[73] Assignee: U.S. Philips Corporation, New York, N.Y.

[21] Appl. No.: 173,848

[22] Filed: Dec. 27, 1993

[30] Foreign Application Priority Data

Dec. 28, 1992 [EP] European Pat. Off. ............ 92204090

[51] Int. Cl.$^6$ .......................... G09G 1/04; H01J 29/58
[52] U.S. Cl. .................................. 315/383; 315/382; 315/386; 315/388; 348/379
[58] Field of Search ............... 315/382, 383, 386, 387, 315/388; 348/379, 687, 677, 678

[56] References Cited

U.S. PATENT DOCUMENTS 3,955,120  5/1976  Jurgensen ........................... 315/384
5,278,476  1/1994  Ten Pierick et al. ............... 315/383

*Primary Examiner*—Gregory C. Issing
*Attorney, Agent, or Firm*—Edward W. Goodman

[57] ABSTRACT

Known display devices include a video signal processing circuit with a black level setting circuit. This black level setting circuit measures the black level of the video signal, for example, during the field retrace interval by making use of an extra output of the video output stage. However, the measured black level has a line-frequency interference component which is caused by a parasitic capacitance in the display tube. The line-frequency interference component is fully compensated for by coupling one side of a secondary winding of a transformer, required for the focusing voltage to be generated, to a first capacitor, the other terminal of which is connected to the measuring input of the black level setting circuit, and by coupling at least a second and a third capacitor across the secondary winding of the transformer.

6 Claims, 1 Drawing Sheet

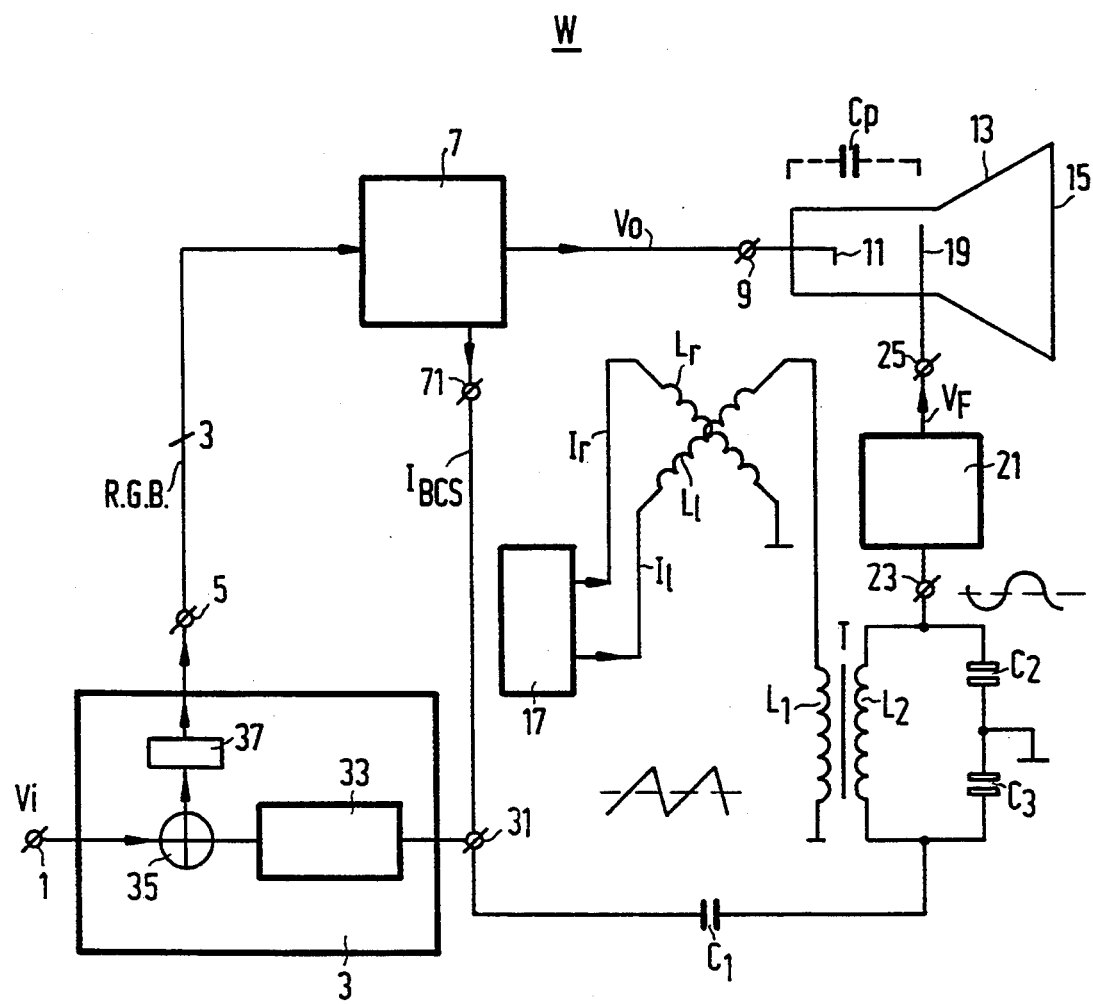

DISPLAY DEVICE INCLUDING A BLACK LEVEL SETTING CIRCUIT

BACKGROUND OF THE INVENTION

1. Field of the Invention

The invention relates to a display device comprising a display tube for displaying a video signal, the display tube comprising focusing electrode means, a video signal processing circuit for receiving an input video signal, processing this video signal and supplying this processed video signal to a video output stage which is coupled to at least one control electrode of the display tube for supplying an output video signal, said video signal processing circuit including a black level setting circuit for setting the black level of the video signal, an output of the video output stage being coupled to a measuring input of the black level setting circuit for supplying a measuring signal, and a focusing voltage generating circuit for driving the focusing electrode means, the focusing voltage generating circuit having an input for receiving a line-frequency signal.

2. Description of the Related Art

A display device of this type is described in the non-prepublished European Patent Application no. 92203393.1 corresponding to U.S. Pat. No. 5,278,476 (PHN 13.885). The display device described in this Patent includes a black level setting circuit for setting the black level. During the field retrace interval, for example, two different control signals are consecutively applied from the video signal processing circuit to the video output stage. The video output stage applies the output video signal to a cathode of the display tube. The video output stage also has an output for supplying a measuring signal which is applied as a feedback signal to the video signal processing circuit. This measuring signal is compared in the black level setting circuit of the video signal processing circuit, with a reference value and, if necessary, the black level is subsequently adapted.

A drawback of this known display device is that the measuring signal comprises line-frequency interference components so that the black level cannot be accurately adjusted, resulting in the occurrence of color errors.

SUMMARY OF THE INVENTION

It is an object of the invention to obviate the above-mentioned drawbacks. To this end, a display device according to the invention is characterized in that the display device includes a transformer, a primary winding of the transformer being coupled to a line deflection unit, while one side of a secondary winding of the transformer is coupled to the input of the circuit for generating the focusing voltage for supplying the line-frequency signal, and the side of the secondary winding remote from the circuit for generating the focusing voltage is coupled via a first capacitor to the measuring input of the black level setting circuit, and in that a series arrangement of at least a second and a third capacitor is arranged parallel to the secondary winding of the transformer, the junction point of said capacitors being coupled to ground.

Due to this capacitive feedback of a part of the focusing voltage, the measuring signal can be "freed" from the line-frequency interference components.

In this respect it is to be noted that a capacitive feedback is known per se from Netherlands Patent Specification NL-B 113865. However, the circuit arrangement described in this Patent Specification has the drawback that the transformer has an extra branch or an extra winding so that the transformer is more complicated and hence more expensive.

An embodiment of a display device according to the invention is characterized in that the ratio between the capacitance of the second capacitor and the capacitance of the third capacitor substantially corresponds to the ratio between a parasitic capacitance present in the display tube and the capacitance of the first capacitor. This yields a full compensation of the line-frequency interference component caused by the parasitic capacitance. By taking the second and third capacitors in a ratio of 1:10, the first capacitor need not have such a small value as the parasitic capacitance.

In an embodiment a Varicap is chosen for the first capacitor so that the compensation of the parasitic capacitance can be completely adjusted.

These and other aspects of the invention will be apparent from and elucidated with reference to the embodiments to be described hereinafter.

BRIEF DESCRIPTION OF THE DRAWING

In the drawing the FIGURE shows a block diagram of a display device according to the invention.

DESCRIPTION OF THE PREFERRED EMBODIMENT

The FIGURE shows a display device W having an input 1 for receiving an input video signal Vi, which input is coupled to a video signal processing circuit 3. An output 5 of the video signal processing circuit supplies a processed video signal (which is ready for display) to a video output stage 7. The video signal supplied to the video output stage will generally be an RGB signal, each component of which is individually amplified in the video output stage and is supplied as an output video signal Vo at an output 9 to a control electrode 11, for example a cathode (generally 3 cathodes for the three colors red, green and blue) of a display tube 13. The beam currents are deflected towards the different positions on the display screen 15 by means of deflection coils Ll and Lr, which deflection coils receive a line deflection current Il and a field deflection current Ir, respectively, under the control of a deflection unit 17. The display tube 13 also comprises focusing electrode means 19 for focusing the beam currents (electron beams). The focusing electrode means are controlled by a circuit 21 for generating a focusing voltage. An input 23 of the circuit for generating the focusing voltage receives a line-frequency parabolic signal so as to ensure that the focusing voltage VF supplied at an output 25 comprises a parabolic component of the line frequency.

A current transformer T is used for generating the line-frequency parabolic input signal. A primary winding L1 is coupled to the line deflection coil Ll so that a line-frequency sawtooth-shaped current also flows through the primary winding L1. This yields a parabolic voltage of the line frequency across the secondary winding L2. One side of the secondary winding is coupled to the input 23 of the circuit 21 for generating the focusing voltage. The line-frequency parabolic input signal at the input 23 is combined in the circuit for generating the focusing voltage with a DC voltage so as to supply the focusing voltage VF at the output 25, which focusing voltage comprises a DC component as well as a line-frequency parabolic AC component. This ensures that the focusing voltage throughout the display screen has a value which is optimum for this specific position.

Since the display tube 13 is not ideal, it will have parasitic capacitances. A parasitic capacitance which has a very detrimental effect on the black level setting is a parasitic capacitance Cp which is capacitively coupled between the focusing electrode means 19 and the control electrode(s) 11. Consequently, the line-frequency parabolic focusing voltage is fed back to the control electrode and hence to the (output 9 of the) video output stage 7.

The video output stage 7 also has an output 71 from which a (black level) measuring signal Ibcs is applied to an input 31 of the video signal processing circuit 3. The video signal processing circuit 3 includes a black level setting circuit 33 which is coupled to the input 31 and measures and, if necessary, corrects the black level with reference to the incoming measuring signal Ibcs so as to ensure that black is really black and not, for example, greenish.

The FIGURE shows the video signal processing circuit 3 in a block diagram, in which an output of the black level setting circuit is coupled to an adder 35, a second input of which receives an input video signal Vi from the input 1 of the display device. An output of the adder 35 is coupled to the output 5 of the video signal processing circuit 3 via a processing circuit 37. The video signal processing circuit is not described in detail because it is not important for the invention.

Due to the capacitive feedback by the parasitic capacitance Cp, the measuring signal Ibcs also comprises a line-frequency sawtooth-shaped component (in fact, this is a current again). Consequently, it is not possible to accurately measure, hence accurately set the black level.

To solve this problem, a series arrangement of two capacitors C2 and C3 is coupled parallel to the secondary winding L2 of the transformer T, while the junction point of the two capacitors is connected to ground. One terminal of the capacitor C2 is coupled to the side of the secondary winding coupled to the input 23 of the circuit for generating the focusing voltage. The terminal of the capacitor C3 remote from ground is coupled to the side of the secondary winding L2 remote from the input 23. The junction point of the secondary winding L2 and the capacitor C3 is connected to the input 31 of the video signal processing circuit via a capacitor C1. Due to this capacitive feedback by means of the capacitor C1, the parasitic feedback of the parasitic capacitance can be compensated for by suitable choice of the capacitance of the capacitor C1 (and the capacitors C2 and C3). If the capacitances of the capacitors C1 and C2 are chosen to be equal, the capacitance of the capacitor C1 should be rendered equal to the capacitance Cp so as to compensate for the influence of the parasitic capacitance Cp. However, the parasitic capacitance will generally have a very small value (for example, 0.18 pF) so that the capacitor C1 should also have a very small value but should be suitable for high voltages (for example, 1000-1500 V). The effect of the parasitic capacitance is fully compensated for by rendering the ratio C3/C2 equal to C1/Cp.

It is possible to determine the value of the parasitic capacitance Cp by (temporarily) substituting C1 for a Varicap (variable capacitor). The parasitic capacitance can be determined by varying the capacitance of the capacitor C1 until the line-frequency sawtooth-shaped component in the measuring signal Ibcs is zero. Subsequently the Varicap can be substituted again for a capacitor having a capacitance which corresponds to the adjusted value of the Varicap. It is alternatively possible to determine the parasitic capacitance in the factory, whereafter this value is mentioned in the specification of the display tube 13.

For, for example, medical applications or other applications in which a very accurate black level is required, the capacitor C1 may be formed as a Varicap so that the value of the parasitic capacitance can be corrected by means of the Varicap if it should change in the case of ageing etc. To prevent, for example, the voltage across the secondary winding L1 from drifting, a resistor R may be arranged parallel to the capacitor C3. It is thereby prevented that the voltage across the secondary winding may acquire such a high value (due to drifting) that there is flashover in the transformer, or that there is flashover and/or damage of the capacitors, which in turn may lead to damage of the video signal processing circuit 3 (which is generally formed as an integrated circuit).

I claim:

1. A display device comprising:
   a display tube for displaying a video signal, said display tube comprising focusing electrode means;
   a video signal processing circuit for receiving and processing an input video signal;
   a video output stage coupled to an output of said video signal processing circuit for receiving the processed video signal, said video output stage being coupled to at least one control electrode of the display tube for supplying an output video signal to said control electrode, said video signal processing circuit including a black level setting circuit for setting a black level of the video signal, an output of the video output stage being coupled to a measuring input of the black level setting circuit for supplying a measuring signal; and
   a focusing voltage generating circuit for driving the focusing electrode means, said focusing voltage generating circuit having an input for receiving a line-frequency signal, characterized in that the display device includes a line deflection unit, and a transformer having a primary winding coupled to said line deflection unit, and a secondary winding having a first end coupled to the input of the focusing voltage generating circuit for supplying the line-frequency signal, and a second end, remote from the focusing voltage generating circuit, coupled via a first capacitor to the measuring input of the black level setting circuit, a series arrangement of at least a second and a third capacitor being arranged parallel to the secondary winding of the transformer, the junction point of said second and third capacitors being coupled to ground.

2. A display device as claimed in claim 1, characterized in that the ratio between the capacitance of the second capacitor and the capacitance of the third capacitor substantially corresponds to the ratio between a parasitic capacitance present in the display tube and the capacitance of the first capacitor.

3. A display device as claimed in claim 1, characterized in that the capacitance of the third capacitor is at least a factor of 10 larger than the capacitance of the second capacitor.

4. A display device as claimed in claim 1, characterized in that a resistor is coupled parallel to the third capacitor.

5. A display device as claimed in claim 1, characterized in that the first capacitor is a variable capacitor.

6. A display device as claimed in claim 2, characterized in that the capacitance of the third capacitor is at least a factor of 10 larger than the capacitance of the second capacitor.

* * * * *